United States Patent
Huang et al.

(10) Patent No.: US 10,990,137 B2
(45) Date of Patent: Apr. 27, 2021

(54) ELECTRONIC DEVICE AND HINGE MECHANISM OF THE SAME

(71) Applicant: Acer Incorporated, New Taipei (TW)

(72) Inventors: Yu-Chin Huang, New Taipei (TW); Hsueh-Chih Peng, New Taipei (TW); Wen-Chieh Tai, New Taipei (TW); Wen-Neng Liao, New Taipei (TW); Kuang-Hua Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/532,715

(22) Filed: Aug. 6, 2019

(65) Prior Publication Data

US 2020/0218315 A1 Jul. 9, 2020

(30) Foreign Application Priority Data

Jan. 8, 2019 (TW) ................................. 108100652

(51) Int. Cl.
*G06F 1/16* (2006.01)

(52) U.S. Cl.
CPC .......... *G06F 1/1681* (2013.01); *G06F 1/1616* (2013.01); *G06F 1/1637* (2013.01); *G06F 1/1679* (2013.01)

(58) Field of Classification Search
None
See application file for complete search history.

(56) References Cited

U.S. PATENT DOCUMENTS

| 6,519,812 | B2 * | 2/2003 | Ko | H04N 5/2251 16/354 |
|---|---|---|---|---|
| 8,943,649 | B2 * | 2/2015 | Chen | G06F 1/1681 16/320 |
| 9,115,750 | B2 * | 8/2015 | Park | G06F 1/1637 |
| 9,342,101 | B2 * | 5/2016 | Hsu | G06F 1/1679 |
| 9,442,533 | B2 * | 9/2016 | Lee | E05D 3/06 |

(Continued)

FOREIGN PATENT DOCUMENTS

| CN | 2430566 Y | 5/2001 |
|---|---|---|
| CN | 2615421 Y | 5/2004 |

(Continued)

OTHER PUBLICATIONS

Chinese language office action dated Nov. 23, 2020, issued in application No. CN 201910063061.5.

*Primary Examiner* — Anthony Q Edwards
*Assistant Examiner* — Rashen E Morrison
(74) *Attorney, Agent, or Firm* — McClure, Qualey & Rodack, LLP

(57) ABSTRACT

A hinge mechanism is provided. The hinge mechanism includes a base, a magnetic assembly, a torque assembly, and a calibration component. The magnetic assembly is disposed in the base. The torque assembly is connected to the base, and includes a substrate, a first cylinder, and a second cylinder. The substrate is disposed in the base. The first cylinder penetrates the substrate, and is rotatable relative to the substrate. The second cylinder penetrates the substrate, and is rotatable relative to the substrate and the first cylinder. The calibration component is disposed between the magnetic assembly and the torque assembly, and abuts an inner wall of the first cylinder, and an inner wall of the second cylinder.

10 Claims, 8 Drawing Sheets

(56) References Cited

U.S. PATENT DOCUMENTS

| | | | |
|---|---|---|---|
| 9,606,578 B2* | 3/2017 | Yuan | G06F 1/1681 |
| 9,677,308 B1* | 6/2017 | Chen | G06F 1/1681 |
| 9,856,909 B1* | 1/2018 | Hsu | E05D 3/122 |
| 9,995,070 B2 | 6/2018 | Hamel | |
| 10,015,897 B1* | 7/2018 | Hong | G09F 9/301 |
| 10,227,808 B2* | 3/2019 | Siddiqui | G06F 1/1681 |
| 10,296,044 B2* | 5/2019 | Siddiqui | F16C 11/04 |
| 10,365,686 B2* | 7/2019 | Tucker | G06F 1/1618 |
| 10,480,227 B1* | 11/2019 | Chen | E05D 3/122 |
| 10,558,245 B2* | 2/2020 | Morrison | G06F 1/1618 |
| 10,641,318 B2* | 5/2020 | Siddiqui | G06F 1/1616 |
| 2008/0109995 A1* | 5/2008 | Kuwajima | H04M 1/022 |
| | | | 16/354 |
| 2009/0013500 A1* | 1/2009 | Ueyama | G06F 1/1616 |
| | | | 16/354 |
| 2009/0070961 A1* | 3/2009 | Chung | E05D 3/122 |
| | | | 16/354 |
| 2009/0144934 A1* | 6/2009 | Kitagawa | G06F 1/1616 |
| | | | 16/320 |
| 2010/0058557 A1* | 3/2010 | Wang | G06F 1/1616 |
| | | | 16/320 |
| 2010/0071157 A1* | 3/2010 | Wang | G06F 1/1681 |
| | | | 16/297 |
| 2011/0157780 A1* | 6/2011 | Wang | G06F 1/1681 |
| | | | 361/679.01 |
| 2012/0042473 A1* | 2/2012 | Wang | G06F 1/1681 |
| | | | 16/319 |
| 2012/0096678 A1* | 4/2012 | Zhang | G06F 1/1681 |
| | | | 16/302 |
| 2012/0192381 A1* | 8/2012 | Zhang | G06F 1/1681 |
| | | | 16/366 |
| 2013/0077041 A1* | 3/2013 | Chih | G02C 5/146 |
| | | | 351/116 |
| 2014/0146484 A1* | 5/2014 | Chen | G06F 1/1679 |
| | | | 361/728 |
| 2014/0211380 A1* | 7/2014 | Tsai | G06F 1/1681 |
| | | | 361/679.01 |
| 2014/0360296 A1* | 12/2014 | Hsu | G06F 1/1618 |
| | | | 74/98 |
| 2015/0009614 A1* | 1/2015 | Tsai | G06F 1/1616 |
| | | | 361/679.27 |
| 2015/0309541 A1* | 10/2015 | Horng | E05D 11/0054 |
| | | | 16/250 |
| 2016/0097227 A1* | 4/2016 | Hsu | F16B 1/00 |
| | | | 16/354 |
| 2016/0187937 A1* | 6/2016 | Ahee | A45C 13/005 |
| | | | 361/679.09 |
| 2017/0235337 A1* | 8/2017 | Vic | E05D 11/00 |
| | | | 361/679.55 |
| 2017/0275935 A1* | 9/2017 | Shang | E05D 3/122 |
| 2019/0166703 A1* | 5/2019 | Kim | G06F 1/1681 |
| 2019/0243426 A1* | 8/2019 | Morrison | G06F 1/1637 |

FOREIGN PATENT DOCUMENTS

| | | |
|---|---|---|
| TW | I490420 B | 7/2015 |
| TW | 201536154 A | 9/2015 |
| TW | M510387 U | 10/2015 |
| TW | M513284 U | 12/2015 |
| TW | I521151 B | 2/2016 |

* cited by examiner

ELECTRONIC DEVICE AND HINGE MECHANISM OF THE SAME

CROSS REFERENCE TO RELATED APPLICATIONS

This application claims priority of Taiwan Patent Application No. 108100652, filed Jan. 8, 2019, the entirety of which is incorporated by reference herein.

BACKGROUND

Technical Field

The disclosure relates to an electronic device and hinge mechanism of the same, and in particular to a hinge mechanism that includes a magnetic assembly, and an electronic device in which the hinge mechanism is disposed.

Description of the Related Art

As technology continuously develops, the use of electronic products is becoming more and more popular in our daily lives, and notebook computers are one kind of electronic product. Hinge mechanisms are generally disposed in existing notebook computers, so that users may rotate, open, or close their notebook computers. 360-degree hinges have been adopted in some notebook computers, so that the screens of the notebook computers may be rotatable in 360 degrees relative to the keyboards. However, the durability of the 360-degree hinges used on the market fails to meet the standard of commercial or military models, and the requirement that the electronic products be durable is also becoming more of a priority for consumers. Therefore, existing 360-degree hinges may not meet requirements in various aspects.

BRIEF SUMMARY

To solve the aforementioned problems, some embodiments of the present disclosure provide a hinge mechanism. The hinge mechanism includes a base, a magnetic assembly, a torque assembly, and a calibration component. The magnetic assembly is disposed in the base. The torque assembly is connected to the base, and includes a substrate, a first cylinder, and a second cylinder. The substrate is disposed in the base. The first cylinder penetrates the substrate, and is rotatable relative to the substrate. The second cylinder penetrates the substrate, and is rotatable relative to the substrate and the first cylinder. The calibration component is disposed between the magnetic assembly and the torque assembly, and abuts an inner wall of the first cylinder, and an inner wall of the second cylinder.

In an embodiment, the calibration component further includes a first shaft and a second shaft, the first shaft abuts the inner wall of the first cylinder, and the second shaft abuts the inner wall of the second cylinder. The first shaft has a conical degree. The shape of the cross-section of the first shaft is irregular, and the shape of the cross-section of an opening in the first cylinder is irregular.

In an embodiment, the magnetic assembly includes a first magnet and a second magnet, and the same magnetic poles of the first magnet and the second magnet face each other. In an embodiment, the hinge mechanism further includes a positioning member that is connected to the substrate and the base, wherein the positioning member penetrates the calibration component. The hinge mechanism further includes a first hinge rod and a second hinge rod, wherein the first hinge rod is connected to the first cylinder, and the second hinge rod is connected to the second cylinder.

In an embodiment, the hinge mechanism further includes a first gear and a second gear, wherein the first gear is disposed around the first cylinder, and the second gear is disposed around the second cylinder. The hinge mechanism further includes an adjustment element disposed in the base, wherein the adjustment element abuts the magnetic assembly.

Some embodiments of the present disclosure provide an electronic device. The electronic device includes a first housing, a second housing, and a hinge mechanism. The second housing is rotatable relative to the first housing, and the second housing is pivoted to the first housing. The hinge mechanism includes a base, a magnetic assembly, a torque assembly, and a calibration component. The magnetic assembly is disposed in the base. The torque assembly is connected to the base, and includes a substrate, a first cylinder, and a second cylinder. The substrate is disposed in the base. The first cylinder penetrates the substrate, and is rotatable relative to the substrate. The second cylinder penetrates the substrate, and is rotatable relative to the substrate and the first cylinder. The calibration component is disposed between the magnetic assembly and the torque assembly, and abuts an inner wall of the first cylinder, and an inner wall of the second cylinder.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The electronic devices and their hinge mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
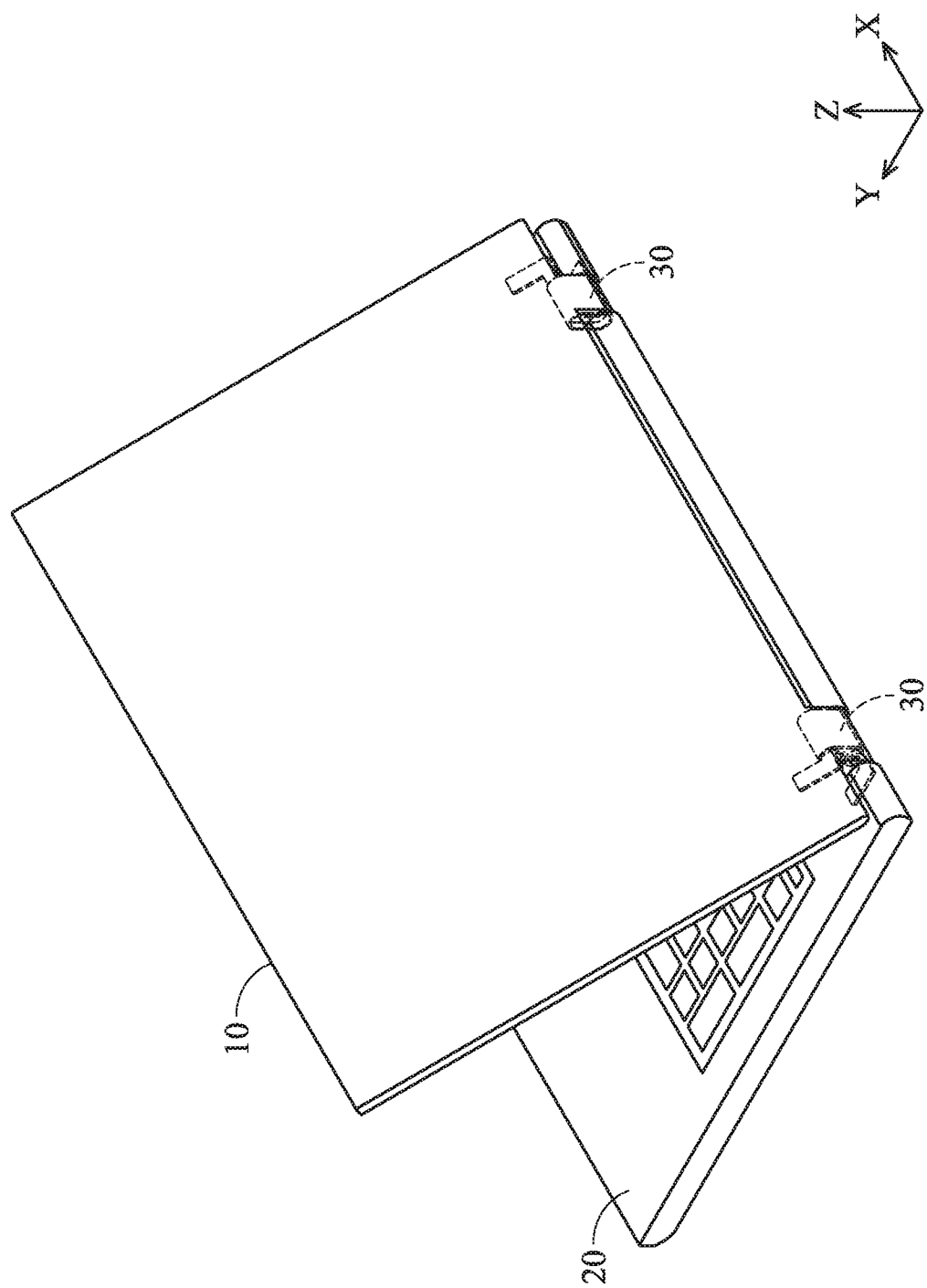
FIG. 1 is a perspective view illustrating an electronic device in accordance with an embodiment of the present disclosure.

Referring to FIG. 1, FIG. 1 is a perspective view illustrating an electronic device 1 in accordance with an embodiment of the present disclosure. For example, the electronic device 1 is a notebook computer. In other embodiments, the electronic device 1 may be other electronic devices with two pieces. As shown in FIG. 1, the electronic device 1 includes a first housing 10, a second housing 20, and two hinge mechanisms 30. The first housing 10 is pivoted to the second housing 20 via the hinge mechanisms 30. The hinge mechanisms 30 may generate enough torque, so that the first housing 10 may rotate 360 degrees relative to the second housing 20, wherein the hinge mechanisms 30 serve as the rotation shaft.

Figure 2:
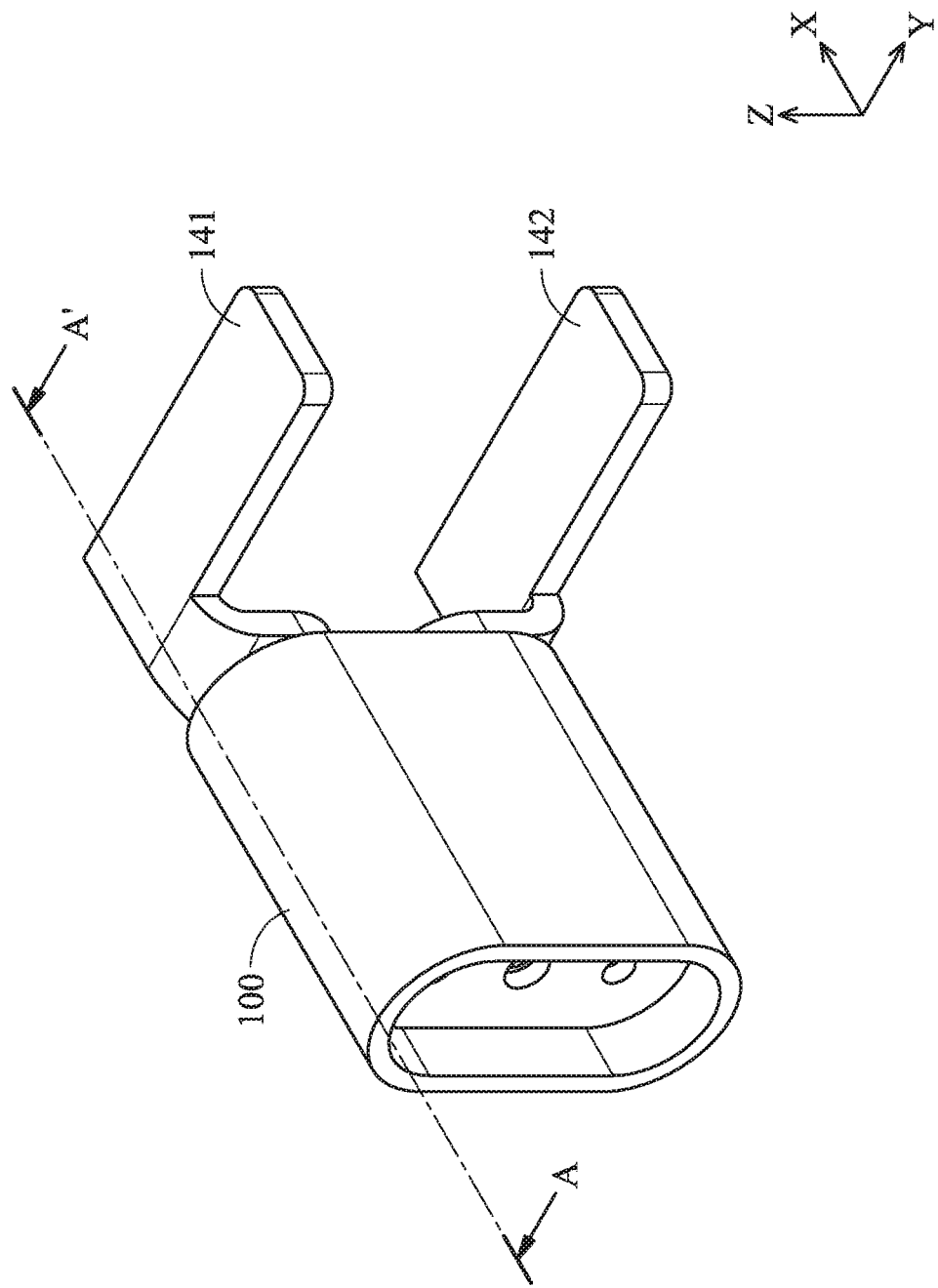
FIG. 2 is a perspective view illustrating a hinge mechanism in accordance with an embodiment of the present disclosure.

Referring to FIG. 2, FIG. 2 is a perspective view illustrating the hinge mechanism 30 in accordance with an embodiment of the present disclosure. As shown in FIG. 2, the hinge mechanism 30 has a base 100 for containing interior components inside the hinge mechanism 30. The hinge mechanism 30 further includes a first hinge rod 141 and a second hinge rod 142, wherein the first hinge rod 141 and the second hinge rod 142 extend out of the base 100 and are rotatable relative to the base 100. Different components are respectively connected to the first hinge rod 141 and the second hinge rod 142. Accordingly, the components are rotatable relative to each other. For example, the first housing 10 is connected to the first hinge rod 141, and the second housing 20 is connected to the second hinge rod 142.

Figure 3:
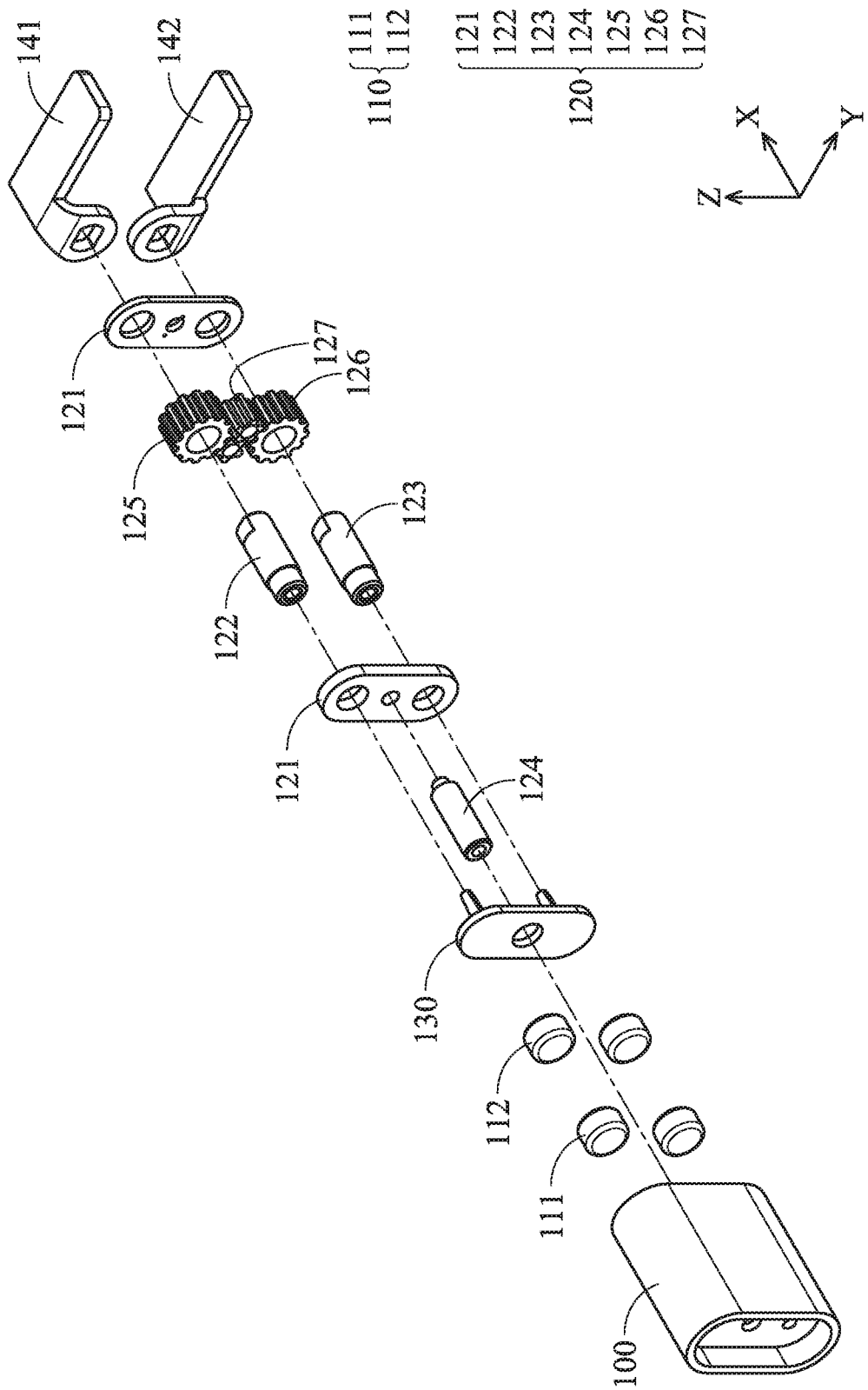
FIG. 3 is an exploded view illustrating the hinge mechanism shown in FIG. 2.

Next, referring to FIG. 3, FIG. 3 is an exploded view illustrating the hinge mechanism 30 shown in FIG. 2. The hinge mechanism 30 further includes a magnetic assembly 110, a torque assembly 120, and a calibration component 130. In the present embodiment, the magnetic assembly 110 includes a first magnet 111 and a second magnet 112, wherein the first magnet 111 is connected to the base 100. The first magnet 111 and the second magnet 112 are arranged in order to generate a repulsive force. That is, a gap is generated between the first magnet 111 and the second magnet 112, and N-poles or S-poles of the magnets are opposite.

The torque assembly 120 includes two substrates 121, a first cylinder 122, a second cylinder 123, a positioning member 124, a first gear 125, a second gear 126, and two central gears 127. The substrates 121 are disposed in the base 100, and a space is formed between the substrates 121 and the base 100. The first cylinder 122 and the second cylinder 123 penetrate holes of the substrates 121 and are rotatable relative to the substrates 121. For example, the first cylinder 122 and the second cylinder 123 may be formed by metal injection molding (MIM). The positioning member 124 of the torque assembly 120 is connected to the substrates 121 and the base 100, whereby the spacing between the torque assembly 120 and the base 100 in X-shaft is controlled, so that the torque assembly 120 may be disposed in the correct position.

The first gear 125, the second gear 126, and the central gears 127 are disposed in the space. That is, the first gear 125, the second gear 126, and the central gears 127 are disposed between the substrates 121, wherein the first gear 125 is disposed around the first cylinder 122, and the second gear 126 is disposed around the second cylinder 123. The central gears 127 are engaged with each other, one of the central gears 127 is engaged with the first gear 125, and the other central gear 127 is engaged with the second gear 126. Accordingly, the first cylinder 122 and the second cylinder 123 may rotate in opposite directions. For example, when the first cylinder 122 rotates in clockwise direction, the second cylinder 123 rotates in counter-clockwise direction, and vice versa.

In addition, the calibration component 130 is disposed between the magnetic assembly 110 and the torque assembly 120. In more details, the second magnet 112 is bonded to the calibration component 130 via an adhesive (not shown), and the calibration component 130 abuts the first cylinder 122 and the second cylinder 123 of the torque assembly 120. The description regarding the way of the calibration component 130 abutting the first cylinder 122 and the second cylinder 123 will be further provided to accompany FIG. 4, as follows. Furthermore, the first hinge rod 141 and the second hinge rod 142 are respectively connected to the first cylinder 122, the second cylinder 123 and may drive the first cylinder 122 and the second cylinder 123 to rotate.

Figure 4:
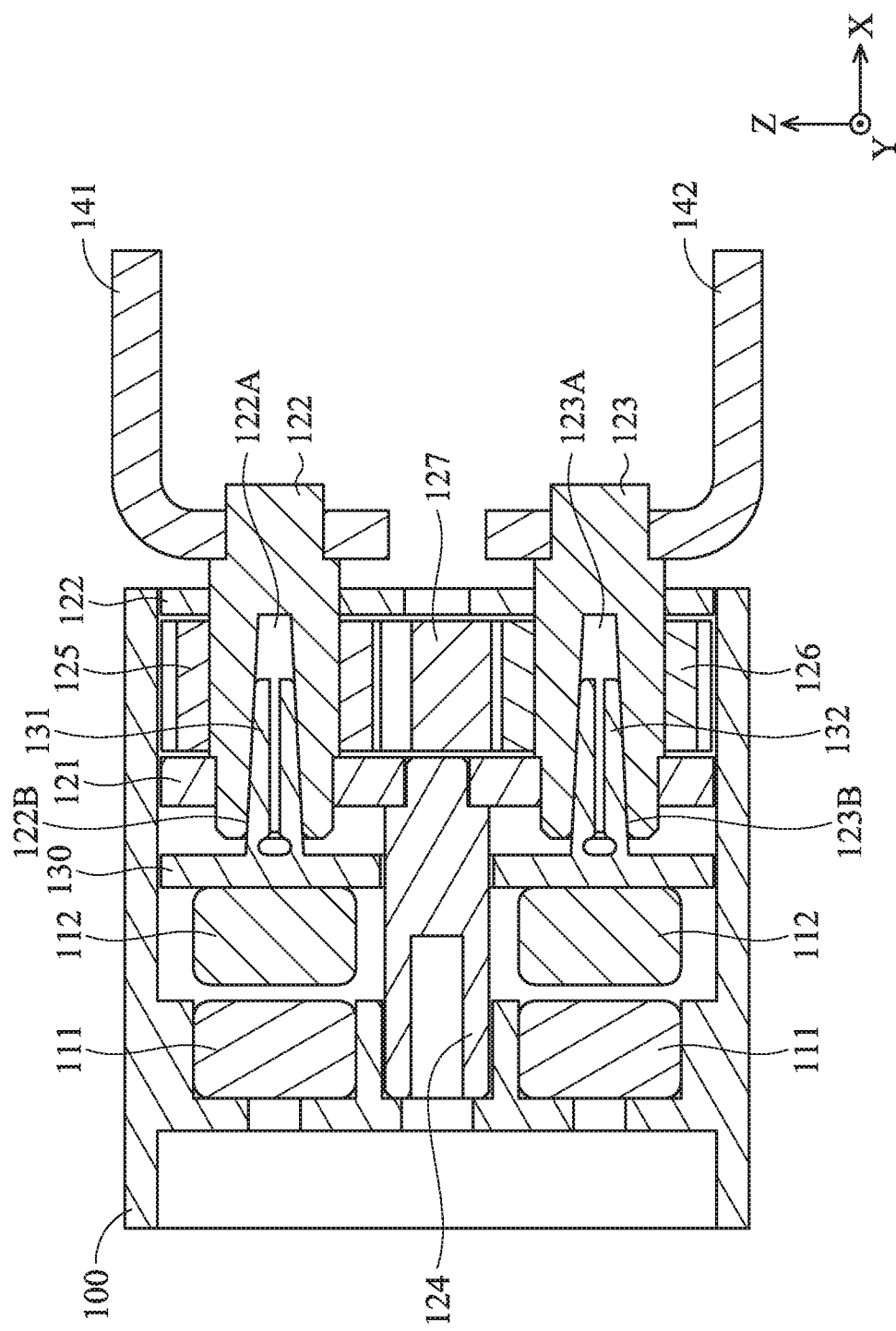
FIG. 4 is a cross-sectional view along line A-A' shown in FIG. 2.

Referring to FIG. 4, FIG. 4 is a cross-sectional view illustrating the cross-section along line A-A' shown in FIG. 2. As shown in FIG. 4, the first cylinder 122 has a first opening 122A, and the first cylinder 122 has a first inner wall 122B in the first opening 122A. Similarly, the second cylinder 123 has a second opening 123A, and the second cylinder 123 has a second inner wall 123B in the second opening 123A. The calibration component 130 includes a first shaft 131 and a second shaft 132. The first shaft 131 abuts the first inner wall 122B of the first cylinder 122, and the second shaft 132 abuts the second inner wall 123B of the second cylinder 123.

It should be noted that the first shaft 131 and the first inner wall 122B have corresponding conical degrees, and the second shaft 132 and the second inner wall 123B also have corresponding conical degrees. In other words, the first shaft 131 and the first inner wall 122B become increasingly narrower inside the first opening 122A. The second shaft 132 and the second inner wall 123B become increasingly narrower inside the second opening 123A. For example, the conical degree may be in a range of 1 degree to 15 degrees. In some embodiments, the conical degree may be in a range of 2 degrees to 5 degrees. Because the first shaft 131 and the second shaft 132 are arranged as cones, the first shaft 131 and the second shaft 132 may be firmly bonded in the corresponding opening 122A and the second opening 123A. Therefore, the stability of the hinge mechanism 30 may be enhanced. However, the present embodiment merely serves as an example. In some other embodiments, the first shaft 131 and the second shaft 132 may be arranged in another shape.

Figure 5A:
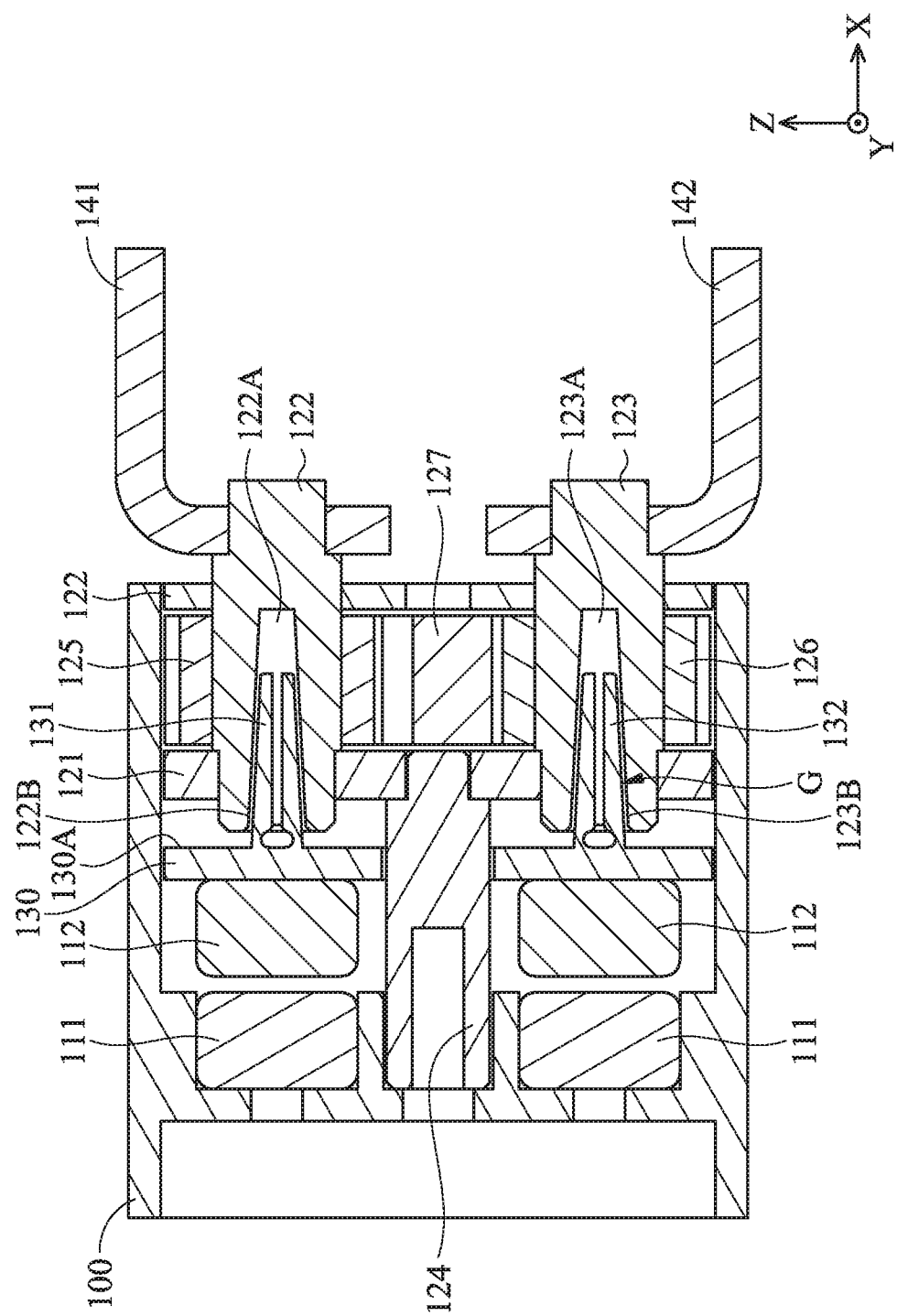
FIGS. 5A and 5B are cross-sectional views illustrating the operating process of the hinge mechanism shown in FIG. 2.

Referring to FIG. 5A, FIG. 5A is a cross-sectional view illustrating the abrasion of the hinge mechanism 30 shown in FIG. 2 after being used. As shown in FIG. 5A, when the first hinge rod 141 and the second hinge rod 142 rotate, friction may occur between the torque assembly 120 and the calibration component 130. Therefore, the first shaft 131, the first inner wall 122B, the second shaft 132, and the second inner wall 123B may be abraded. A gap G may be generated between the first shaft 131, the first inner wall 122B and between the second shaft 132, the second inner wall 123B. At this time, the bottom surface 130A of the calibration component 130 does not abut the first cylinder 122 and/or the second cylinder 123. Therefore, the calibration component 130 may be pushed by a force that is generated by the magnetic assembly 110, and move towards the first cylinder 122 and/or the second cylinder 123 for the calibration. The detailed description will be provided to accompany FIG. 5B.

It should be noted that the hardness of the first shaft 131, the first inner wall 122B, the second shaft 132, and the second inner wall 123B should be equal or approximately equal, so that the abrasion of the first shaft 131, the first inner wall 122B, the second shaft 132, and the second inner wall 123B are similar. Accordingly, any one of the aforementioned features may resist becoming worn too early, reducing the lifetime of the hinge mechanism 30. For example, the Rockwell hardness number, scale C (HRC) of the first shaft 131, the first inner wall 122B, the second shaft 132, and the second inner wall 123B may be in a range of about 43 to about 46.

Figure 5B:
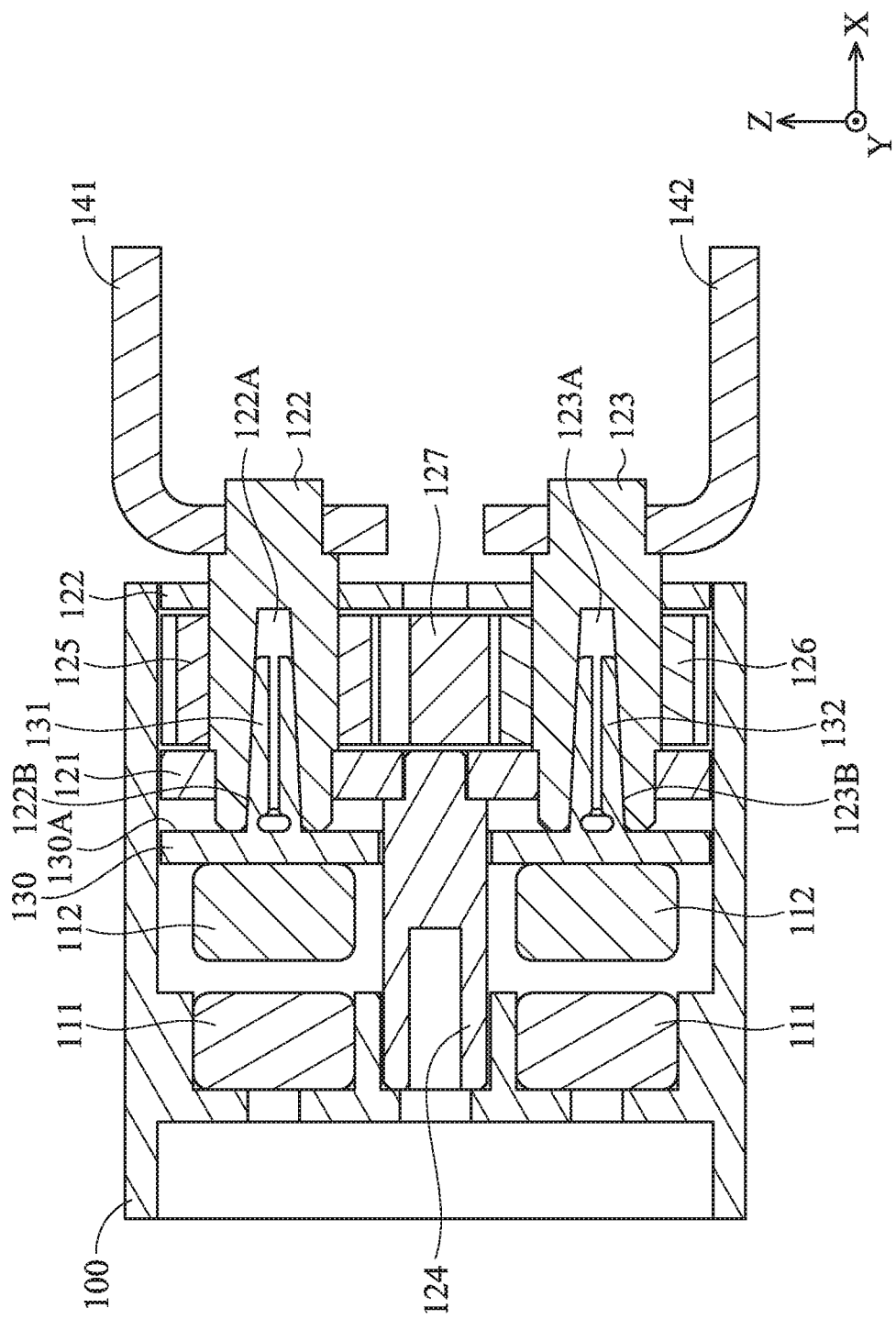

Next, referring to FIG. 5B, FIG. 5B is a cross-sectional view illustrating the hinge mechanism 30 shown in FIG. 2 after automatically compensating for the gap G. As shown in FIG. 5B, a repulsive force may be generated between the first magnet 111 and the second magnet 112 of the magnetic assembly 110. The repulsive force may push the calibration component 130 towards the first cylinder 122 and the second cylinder 123. Therefore, the first shaft 131 and the second shaft 132 respectively go deep into the first opening 122A of the first cylinder 122 and the second opening 123A of the second cylinder 123. Accordingly, the first shaft 131 and the second shaft 132 may continuously abut the first inner wall 122B and the second inner wall 123B, so that sufficient torque may be generated. Under common use environment, the magnetic force of the magnetic assembly 110 would not decrease over time. Compared to the torque generated by an elastic element (such as a spring) pushing the calibration component 130, elastic fatigue issue does not occur when using the magnetic assembly 110. Therefore, the durability of the hinge mechanism 30 may be significantly increased.

It should be noted that when the bottom surface 130A of the calibration component 130 abuts the first cylinder 122 and/or the second cylinder 123, the calibration component 130 cannot be pushed towards the first cylinder 122 and/or the second cylinder 123 by the magnetic assembly 110. Under these circumstances, the hinge mechanism 30 may fail to automatically compensate for the gap G (as shown in FIG. 5A). Therefore, when the gap G is generated, the hinge mechanism 30 fails to provide the original torque. To solve the aforementioned issue, the torque assembly 120 may be removed, and a new calibration component 130 may be installed. As a result, the bottom surface 130A of the new calibration component 130 does not contact the first cylinder 122 or the second cylinder 123, and the hinge mechanism 30 may provide its original torque again.

Figure 6A:
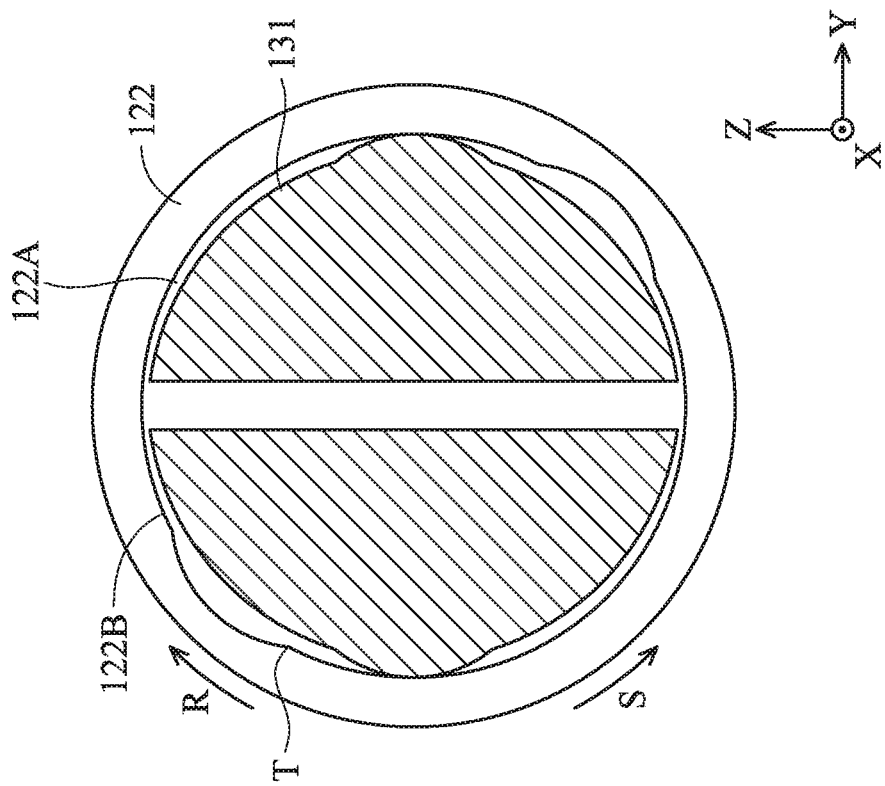
FIGS. 6A and 6B are cross-sectional views illustrating a first shaft and a first opening in accordance with an embodiment of the present disclosure.

Referring to FIG. 6A, FIG. 6A is cross-sectional view illustrating the first cylinder 122 and the first shaft 131, which are located in a predetermined position, in accordance with an embodiment of the present disclosure. As shown in FIG. 6A, the cross-sections of the first shaft 131 and the first opening 122A are irregular shapes that are like a circle along the Y-Z plane. The first shaft 131 and the first opening 122A each have protruding portions at two ends along the Y-axis. Thanks to the arrangement of the cross-sections of the first shaft 131 and the first opening 122A as irregular shapes, the first cylinder 122 may be affixed when the hinge mechanism 30 is not operating. It should be noted that the present embodiment merely serves as an example. In some other embodiments, the first shaft 131 and the first opening 122A may be disposed as other shapes, as required. In addition, the second shaft 132 and the second opening 123A may each have a shape that is either similar to or different than the shape of the first shaft 131 and the shape of the first opening 122A.

Figure 6B:
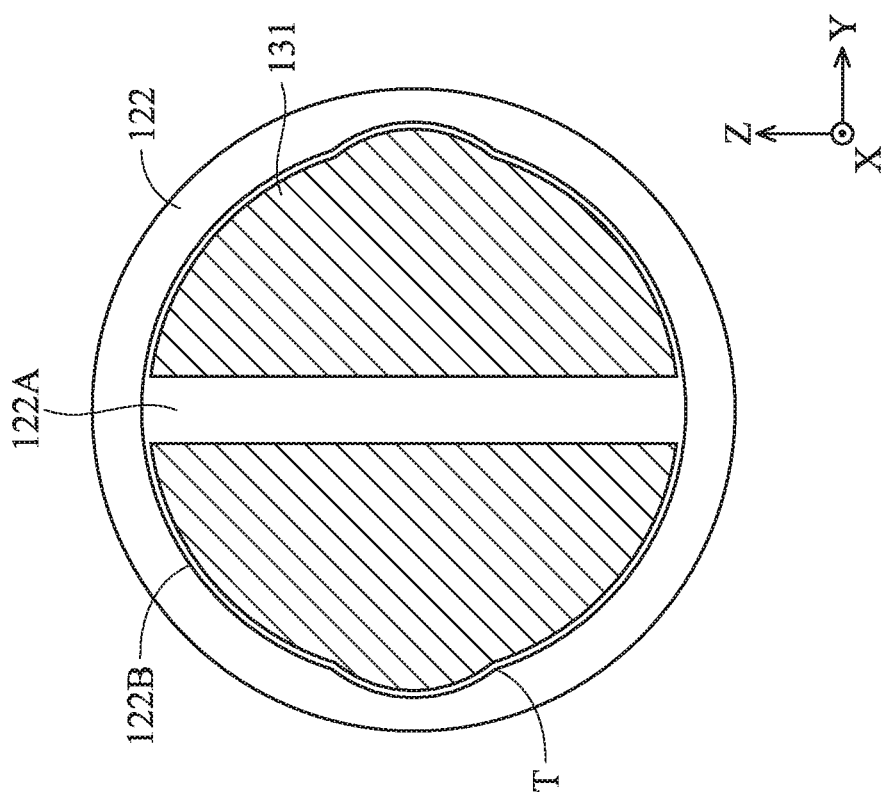

FIG. 6B is a cross-sectional view illustrating the first cylinder 122 that rotates relative to the first shaft 131. In the present embodiment, the first cylinder 122 rotates relative to the first shaft 131 in clockwise direction (shown as the arrow R). Under these circumstances, the first inner wall 122B may abut the protruding portion of the first shaft 131, so that torque may be generated. Since the first shaft 131 has a hollow structure at its center, when the first cylinder 122 rotates, the first inner wall 122B would not be stuck with the protruding portion of the first shaft 131, which cause the first cylinder 122 unable to rotate.

It should be appreciated that the first cylinder 122 rotates in counter-clockwise direction (shown as the arrow S), the position T of the first inner wall 122B passes through the protruding portion of the first shaft 131. Since the first opening 122A has a corresponding protruding portion, the first cylinder 122 may automatically return to the predetermined position shown in FIG. 6A. Thanks to the design, after users close the electronic device 1, with the hinge mechanism 30, to less than a certain degree, the electronic device 1 may be automatically closed.

Figure 7:
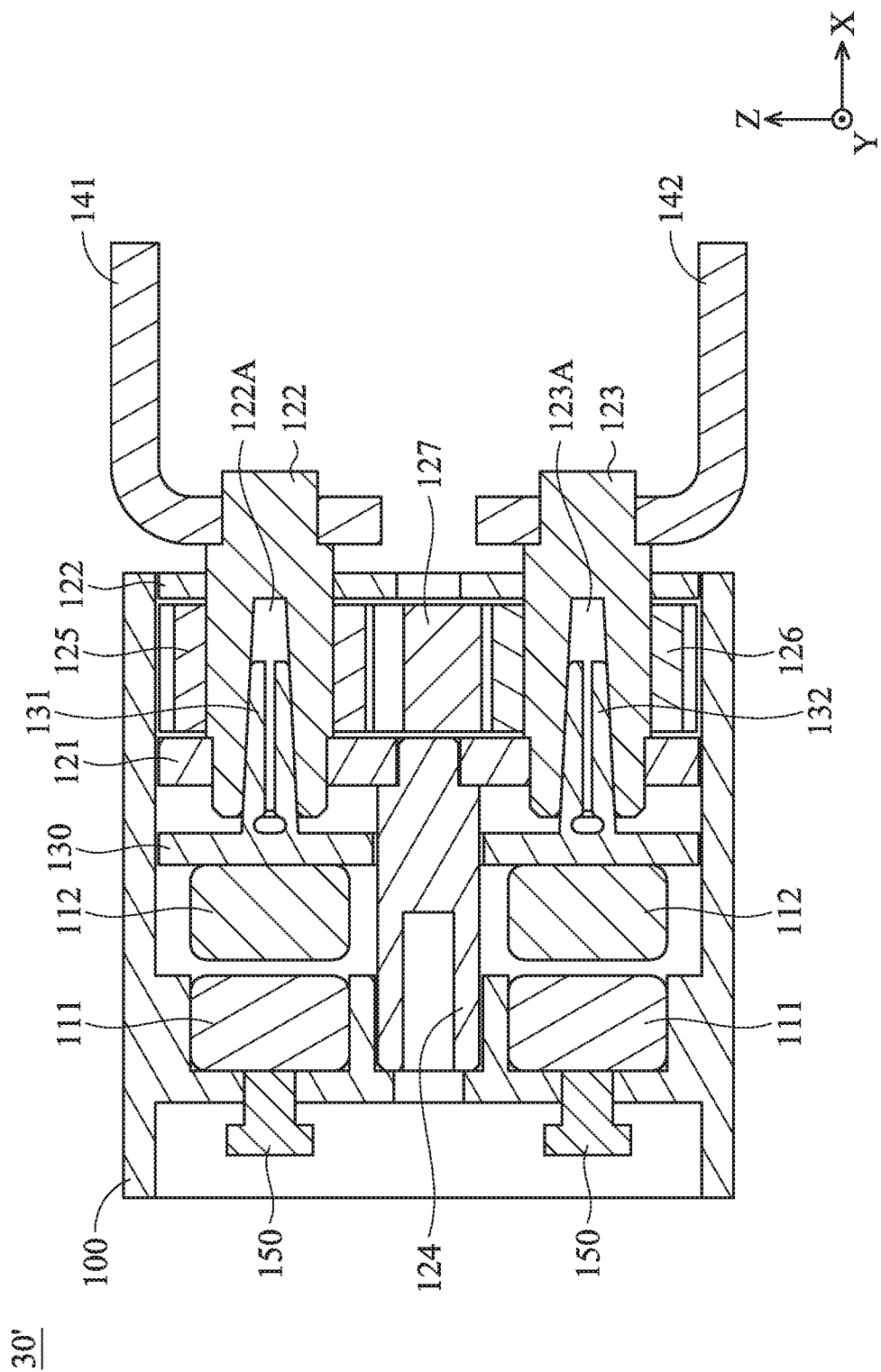
FIG. 7 is a perspective view illustrating the hinge mechanism in accordance with another embodiment of the present disclosure.

Referring to FIG. 7, FIG. 7 is a perspective view illustrating a hinge mechanism 30' in accordance with another embodiment of the present disclosure. It should be noted that the hinge mechanism 30' may include elements that are the same or similar to the hinge mechanism 30 shown in FIG. 2. Those elements will be labeled as the same or similar numerals, and will not be discussed in detail again. The difference between the hinge mechanism 30' and the hinge mechanism 30 shown in FIG. 2 is that the hinge mechanism 30' further includes two adjustment elements 150 disposed in the base 100. The adjustment elements 150 abut the first magnet 111 of the magnetic assembly 110. When the hinge mechanisms 30' are manufactured, tolerance may be generated between different hinge mechanisms 30'. The tolerance may cause the difference of the torque generated by the calibration component 130 and the first cylinder 122, the second cylinder 123. To solve the aforementioned issue, the spacing between the first magnet 111 and the second magnet 112 may be adjusted by the adjustment elements 150. Therefore, the tolerance, generated when the hinge mechanisms 30' are manufactured, between different hinge mechanisms 30' may be calibrated. As a result, the production yield may be increased.

As set forth above, the present disclosure provides a hinge mechanism including a magnetic assembly, and an electronic device that the hinge mechanism is installed therein. The calibration component may be continuously pushed by the repulsive force that is generated by the magnetic assembly. Therefore, the hinge mechanism may still provide the original torque after being used for a period of time. As the cross-sections of the shafts and the openings are designed as irregular shapes, the positions of the shafts may be affixed when the hinge mechanism is not operating. In addition, after users close the electronic device to less than a certain degree, the electronic device may be closed automatically.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A hinge mechanism, comprising:
   a base;
   a magnetic assembly disposed in the base;
   a torque assembly, connected to the base, comprising:
   a substrate disposed in the base;
   a first cylinder, penetrating the substrate, rotatable relative to the substrate, wherein the magnetic assembly is movable along a rotation axis of the first cylinder, and a moving direction of the magnetic assembly is parallel to the rotation axis of the first cylinder; and
   a second cylinder, penetrating the substrate, rotatable relative to the substrate and the first cylinder; and
   a calibration component, disposed between the magnetic assembly and the torque assembly, abutting an inner wall of the first cylinder and an inner wall of the second cylinder.

2. The hinge mechanism as claimed in claim 1, wherein the calibration component further comprises a first shaft and a second shaft, the first shaft abuts the inner wall of the first cylinder, and the second shaft abuts the inner wall of the second cylinder.

3. The hinge mechanism as claimed in claim 2, wherein the first shaft has a conical degree.

4. The hinge mechanism as claimed in claim 2, wherein the shape of a cross-section of the first shaft is irregular, and the shape of a cross-section of an opening in the first cylinder is irregular.

5. The hinge mechanism as claimed in claim 1, wherein the magnetic assembly comprises a first magnet and a second magnet, and the same magnetic poles of the first magnet and the second magnet face each other.

6. The hinge mechanism as claimed in claim 1, further comprising a positioning member connected to the substrate and the base, wherein the positioning member penetrates the calibration component.

7. The hinge mechanism as claimed in claim 1, further comprising a first hinge rod and a second hinge rod, wherein the first hinge rod is connected to the first cylinder, and the second hinge rod is connected to the second cylinder.

8. The hinge mechanism as claimed in claim 1, further comprising a first gear and a second gear, wherein the first gear is disposed around the first cylinder, and the second gear is disposed around the second cylinder.

9. The hinge mechanism as claimed in claim 1, further comprising an adjustment element disposed in the base, wherein the adjustment element abuts the magnetic assembly.

10. An electronic device, comprising:
    a first housing;
    a second housing rotatable relative to the first housing; and
    the hinge mechanism as claimed in one of claims 1 to 9, wherein the second housing is pivoted to the first housing via the hinge mechanism.

* * * * *